Jan. 5, 1926.
W. J. SPENCER
1,568,860
AUTOMATIC AIR HOSE COUPLING
Filed Feb. 7, 1925
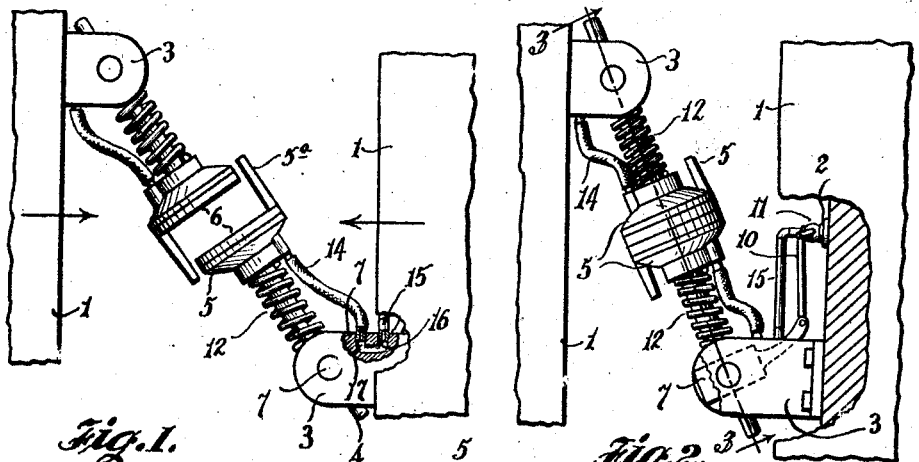
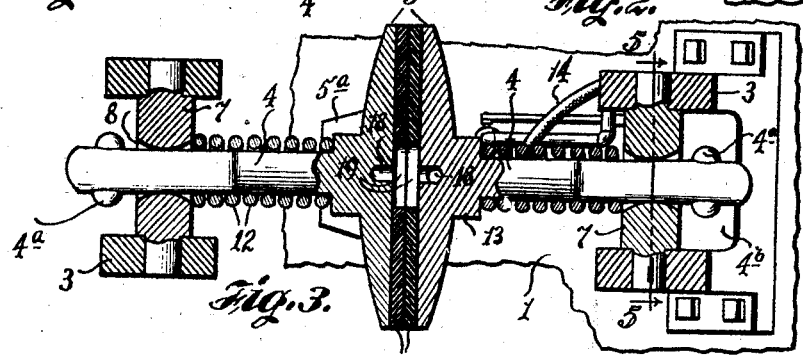
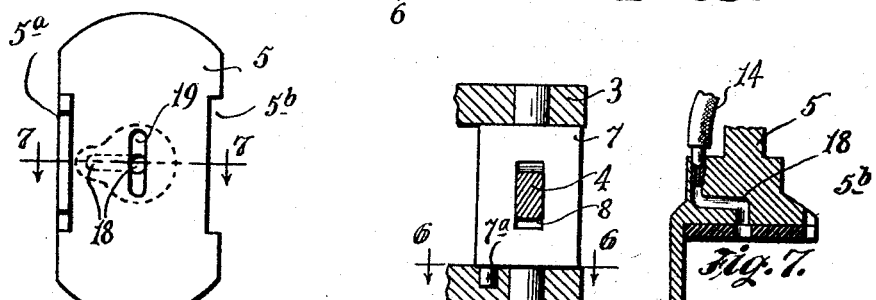
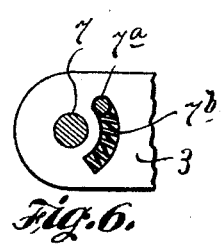
W. J. Spencer,
Inventor,
By John M. Spellman
Attorney.

Patented Jan. 5, 1926.

1,568,860

UNITED STATES PATENT OFFICE.

WALTER J. SPENCER, OF DALLAS, TEXAS.

AUTOMATIC AIR-HOSE COUPLING.

Application filed February 7, 1925. Serial No. 7,691.

*To all whom it may concern:*

Be it known that I, WALTER J. SPENCER, a citizen of the United States, residing at Dallas, in the county of Dallas and State of Texas, have invented certain new and useful Improvements in Automatic Air-Hose Couplings, of which the following is a specification.

This invention relates to air brake equipment for railway cars and refers more particularly to an automatic air hose connection.

The primary object of the invention is to provide in combination with the regular air hose on railway equipment, a coupling which will automatically connect the air hose from one car to another simultaneously with the coupling of the cars.

Another object of the device is that it eliminates the necessity of the brakeman passing in between the cars to connect and disconnect the air hose by hand as is the present custom and thus provides against possible personal injury.

The air hose coupling is also arranged and constructed so that when the coupling is effected the compressed air pipe is opened and air is admitted directly into the air pipe of the car being coupled.

With the above and other minor yet important objects in view, the invention will be more fully understood by reference to the following description, in connection with the accompanying drawings, forming part hereof, and in which;

Figure 1 is a top or plan view of the air hose coupling embodied upon the ends of two adjacent cars, the latter being shown in fragmentary section.

Figure 2 is a similar view, and showing the position of the coupling after the connection has been effected.

Figure 3 is a longitudinal sectional view on the line 3—3 of Figure 2.

Figure 4 is a face view of one of the members which abut each other when the couplings are made.

Figures 5, 6 and 7 are detail sectional views along their respective lines taken from Figures 3, 5 and 4.

In carrying out the detailed description of the invention, 1 denotes the ends of adjacent cars upon which the regular air brake pipe 2 is already installed.

The air hose coupling comprising the invention is pivoted to projecting supports 3—3 on each car 1 and consists of a pair of arms 4—4 with oblong flat-surfaced engaging ends 5—5 provided with rubber facing 6—6 and a finger 5ª and notch 5ᵇ, the objects of which are obvious. The rubber facing forms abutting surfaces and when the arms are pressed together a tight joint is thus produced, aided by the resiliency of the rubber. These arms, as will be noted in Figures 1, 2 and 3, project loosely through a vertically disposed member 7, pivoted in the supports 3—3, this member being recessed at 8 to allow free vertical movement of the arms. On the bottom of member 7 is a pin 7ª under tension of a spring 7ᵇ which retains the arm in a normal position as in Figure 1 when uncoupled. Also the end of the arm 4 is provided with two knobs 4ª for the purpose of holding the arm in position in member 7, these knobs abutting against member 7 and allowing the arm free play. It will thus be understood that free movement is provided for the arms 4—4 both vertically and laterally during the movement of a train around curves and over uneven surfaces of the track.

The member 7, as will be seen from Figure 2, has its rear part curved inward and connected to a valve link 10, which operates when the coupling is made to open and close a valve 11, on air pipe 2, as the arms are swung into and out of coupling and release positions, illustrated in Figures 1 and 2. A spring 12, placed between the member 7 and a shoulder 13 on the rear of the engaging ends 5, provides sufficient pressure to cause the rubber facings 6 to be pressed firmly together to prevent escape of air when the coupling is made. This spring will also provide sufficient pressure between the members 5 and 7 so as to draw the knobs 4ª against the member 7 when uncoupled, as shown in Figure 1, thereby holding the arms 4 in a horizontal position to prevent any sagging of the beads 5 and retained in proper position to be coupled.

The means for admitting air from pipe 2 to the engaging ends of the arms is clearly shown in Figures 1, 3 and 7 and wherein 15 is a short pipe conducting air from pipe 2 to inlet port 16 in member 7. From this member and through a port 17, air then passes through the hose 14 to a port 18 in engaging end 5 of arm 4, thence into the space 19 to opposite exit port 18 to the other portion of the coupling or plate, alike in all respects.

From the above it is evident that a safe and practical means is provided for making the air hose coupling and that the device may be attached to railroad cars in present use by the arrangement provided. It should be understood, however, that changes and modifications may be made in the construction of the device in keeping with the following claims:

1. In an automatic hose coupling for railway cars having the standard air brake line in which is included a valve, comprising in combination coupling means connected for horizontal swinging movement to the ends of each car and disposed diagonally between adjacent cars, means for conducting air from the valve through the coupling means, means operably connecting the coupling means to the valve to cause opening of the valve simultaneously with the engagement of the coupling means, and resiliently controlled stop means for limiting the swinging movement of the coupling means and for causing closing of the valve upon the uncoupling of the coupling means.

2. In an automatic air hose coupling for railway cars having the standard air brake pipe in which is included a valve comprising in combination a support secured to the ends of each railway car, a block member journalled within said support, means operatively connecting said block member with said support for normally retaining the block member in proper position, an arm slidably mounted within said block member, a flat plate having an air port therein formed with one end of said arm, a coiled spring arranged between said plate and block member, an air hose connecting said port with the air brake pipe, and means for operatively connecting said block member with the valve of the air brake pipe.

3. In an automatic air hose coupling for railway cars having the standard air brake pipe in which is included a valve comprising in combination supports secured to the ends of each railway car and arranged diagonally with respect to each other, a block member journalled in each of said supports, a coupling arm slidably and yieldably mounted in each of said block members and extending diagonally and forwardly of the car for engagement with each other, means for conducting air from said valve to and through said arms, resiliently controlled stop means for permitting limited rotational movement of said block members in said supports and means for operatively connecting said block members to the valve of the air brake pipe whereby said valve may be opened and closed when a coupling is made.

4. An automatic air hose coupling for railway cars having the standard air brake in which is included a valve comprising in combination supports carried by the respective ends of each railway car, a block member rotatably mounted in each of said supports, an arm slidably mounted in each block, a flat resilient surfaced coupling plate at the outer end of each arm and provided with an air port and a recess, a guide finger on each plate for engagement with the recess in the opposite plate, said supports having air ports for permitting exit and entrance of air therethrough from said brake pipe to said plates, means for automatically releasing the air pressure from the valve in said brake pipe into said supports and said plates when the coupling is made, means for controlling the swinging movement of said arms and means for holding said plates in a position to be coupled when the plates are disengaged from each other.

In testimony whereof I have signed my name to this specification.

WALTER J. SPENCER.